April 29, 1969

L. H. CAVENY 3,440,820

THERMAL PROTECTION SYSTEM FOR MISSILE COMPONENTS
SUBJECTED TO EXCESSIVE PERIODS
OF AERODYNAMIC HEATING
Filed March 13, 1967

Leonard H. Caveny INVENTOR.

BY

ATTORNEY

United States Patent Office 3,440,820
Patented Apr. 29, 1969

3,440,820
THERMAL PROTECTION SYSTEM FOR MISSILE COMPONENTS SUBJECTED TO EXCESSIVE PERIODS OF AERODYNAMIC HEATING
Leonard H. Caveny, Huntsville, Ala., assignor to Thiokol Chemical Corporation, Bristol, Pa., a corporation of Delaware
Filed Mar. 13, 1967, Ser. No. 622,668
Int. Cl. F02k 9/04; F41f 3/04; F42b 11/00
U.S. Cl. 60—253
3 Claims

ABSTRACT OF THE DISCLOSURE

A thermal protective system for missile components that is adapted to maintain a low temperature range within the missile to sustain the structural properties of the components of the missile to retain temperatures of the interface bonds and adhesives at a low level and to prevent the propellant within the missile from being heated to its autoignition point.

BACKGROUND OF THE INVENTION

Field of the invention

At the present time the components of a missile are insulated from excessive aerodynamic heating by thick layers of either an ablative or subliming insulation. This insulation is used especially for missiles that are attached to the external surface of or carried by the airplane that is to launch them. Since the missiles are subjected to high Mach number environments prior to launching, the missiles are subjected to excessive external heating conditions that may be detrimental to the missile and prevent it from carrying out its operational mission. In some instances, however, the layers are of sufficient weight either to reduce the size of payload or the range of the missile and attempts to reduce the thickness of the layers to overcome this problem terminate in very inefficient results in protecting the missile from aerodynamic heating.

Description of the prior art

Many attempts have been made to provide light weight insulation, using various types of material in an effort to achieve low weight, but at the present time the various types of insulation that have been used have not performed to a degree that will provide adequate protection under all conditions of aerodynamic heating.

SUMMARY OF THE INVENTION

This invention, therefore, is intended to provide improvements in a thermal protection system that will maintain a low temperature range within a missile to protect the missile during excessive periods of aerodynamic heating.

There is at the present time a demand for a more efficient thermal protection system for missile components that are subjected to excessive periods of aerodynamic heating which are caused during the captive flight, i.e. aboard the aircraft that is to launch the missile when achieving a supersonic approach to a target, and also when it is desirable to sustain a high Mach number during low altitude trajectory.

The instant invention is particularly adapted for use with solid propellant rocket missiles to maintain the temperature in the missile at a low range so that the structural properties of the components are adequate for the missile to achieve its mission. Further, the thermal protection system embodying the instant invention will maintain the temperatures of the interface bonds and the adhesives used in the missile within an acceptable safe range and finally will prevent the solid propellant within the missile from being heated to its autoignition point. The thermal protection system will also eliminate the need for heavy layers of insulation that will provide a weight problem for the missile.

An object of the invention is, therefore, to provide a thermal protection system that will protect missile components that are subjected to excessive periods of aerodynamic heating.

Another object of the invention is to provide a thermal protection system that will maintain a low temperature range within the missile so that the structural properties of the missile are maintained and there is protection of the solid propellant within the missile to prevent it from reaching its autoignition point.

It is with the above and other objects and advantages in view, that will be apparent to those skilled in the art, from the following detailed description that the invention is illustrated in the accompanying drawing in which:

DESCRIPTION OF THE PREFERRED EMBODIMENTS

Figure 1:
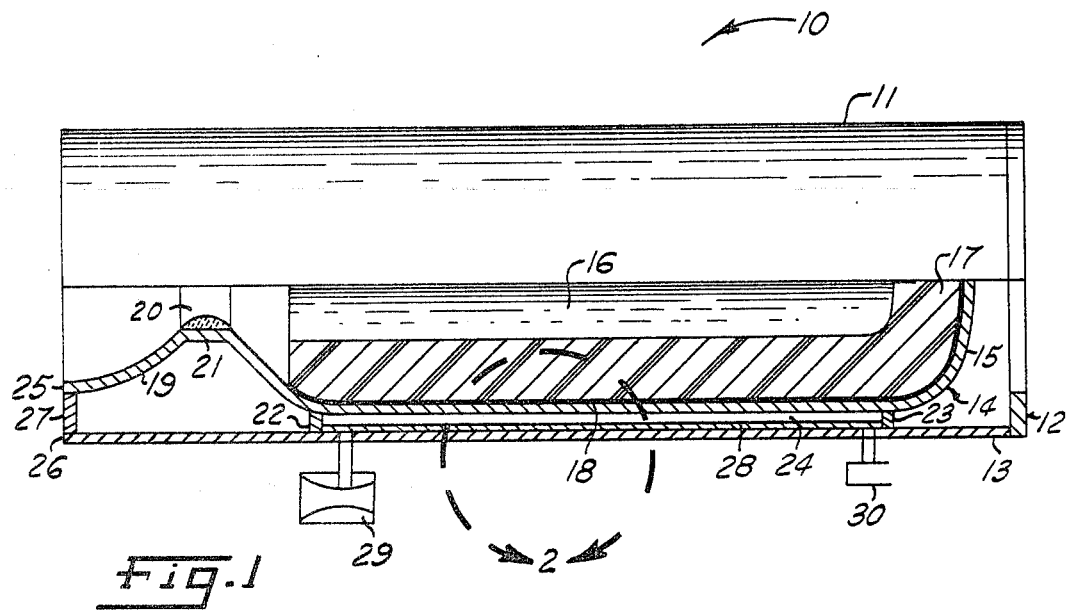
FIGURE 1 is a longitudinal sectional view of a missle equipped with a thermal protection system embodying the instant invention.
Figure 2:
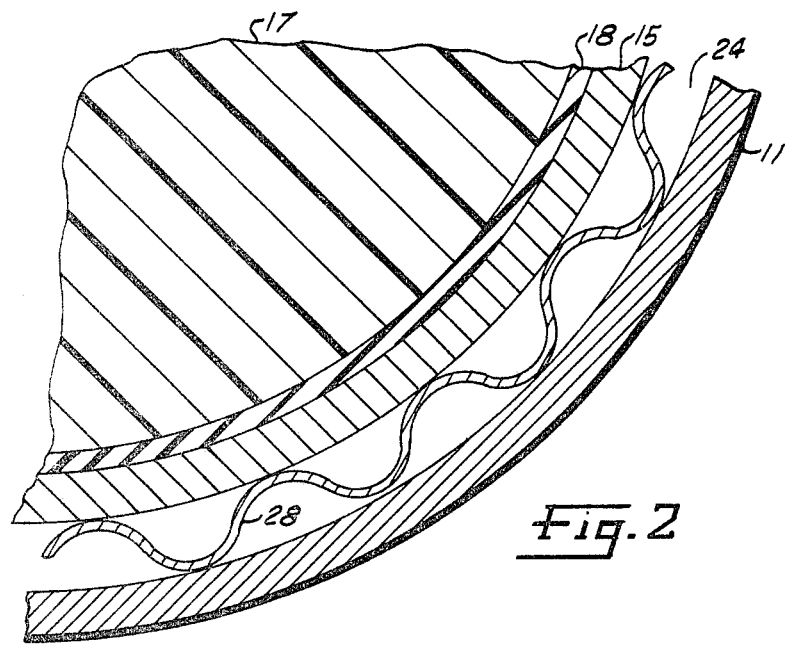
FIGURE 2 is an enlarged detailed fragmentary view of that area within the dotted circle 2 of FIGURE 1.

Referring more in detail to the drawing wherein like parts are designated by like reference numerals, the reference numeral 10 is used to generally designate a solid propellant rocket missile.

The invention contemplates a missile 10 that comprises an outer tubular open ended shield or sleeve 11 which may be of any size that will suit the operational requirements that have been set for the missile 10.

An annular ring 12 is secured to the edge of the open head end 13 of the shield 11 and a solid propellant rocket motor 14 is mounted within the shield 11. The rocket motor 14 comprises a motor case 15 in which is positioned within a combustion chamber 16 formed by the motor case 15, a solid propellant grain 17 and an insulation liner 18 is positioned between the inner surface of the motor case 15 and the outer surface of the solid propellant grain 17 and is bonded thereto. As is the usual procedure, a nozzle 19 is secured to the aft end of the motor case 15 in any well-known manner and it is conventional to mount a throat insert 20 within the throat 21 of the nozzle 19.

The rocket motor 14 is rigidly mounted within the shield 11 by means of annular ring-shaped supports 22 and 23 and these supports equally space the rocket motor 14 circumferentially from the interior surface of the shield 11 to provide a space or gap 24 between the rocket motor 14 and the shield 11.

In some instances the diameter of the outer edge 25 of the nozzle 19 will be of the same diameter as the aft end 26 of the shield 11 at which time the outer edge 25 of the nozzle 19 will be rigidly secured to the outer edge of the aft end 26 of the shield 11, however, if the diameter of the outer edge 25 of the nozzle 19 is of lesser diameter than the outer edge of the aft end 26 of the shield 11, an annular ring-shaped spacing member 27 may be positioned between the outer edge 25 of the nozzle 19 and the outer edge of the aft end 26 of the shield 11 and rigidly secured thereto.

The outer surface of the motor case 15 and the inner surface of the shield 11, in that area encompassed by the supports 22 and 23, are mirrored so that such mirrored surfaces are in diametrically opposed relation to each other.

Before the motor case 15 is positioned in the shield 11, with the surfaces previously discussed already mirrored and after the support 23 has been secured in place, a longitudinally extending corrugated insert 28 is positioned in the gap 24 and the supports 22 is then secured in place, as previously referred to. The purpose of the corrugated insert 28 is to add rigidity to the shield 11. It will have mirrored surfaces on both sides and will be made of material with a low thermal conductivity. It is possible that the use of the corrugated insert 28 may not be required in all applications of the instant invention.

The volume in the missile 10 that is defined by the gap 24 is then evacuated and this evacuation reduces to a minimum free convection heat transfer between the two mirrored surfaces of the motor case 15 and shield 11 and the mirrored surfaces reduce the radiative heat transfer between such mirrored surfaces. Thus the missile components are protected from execessive periods of aerodynamic heating.

There are some missions such as captive flight, i.e. when the missile is secured to the wings or fuselage of an airplane, that require high efficiency in the use of thermal protection. The speed of the airplane will or can reach a high Mach number and such speed places an undue strain on the missile components and increases the aerodynamic heating of the missile.

In missions of this type, increased thermal protection can be obtained by circulating a cooling medium through the gap 24 between the rocket motor case 15 and the shield 11.

This is accomplished by mounting an eductor 29 on the shield 11 and arranging such mounting so that the eductor 29 is in communication with the gap 24, at the aft end thereof. In this position of mounting, the eductor 29 is exposed to the external environment, i.e. the dynamic pressure and the temperature the missiles experience decreases as the altitude of the airplane increases and also as the speed of the airplane decreases. The eductor will create a suction on the gap 24 to evacuate the volume within the gap 24, as previously discussed and to permit cool air to enter the gap 24, as it is evacuated a thermally controlled inlet valve 30 will also be mounted on the shield 11. The valve 30 will be forward of the eductor 29 and will be mounted on the shield 11 at the forward end of the gap 24 in communication therewith.

The eductor 29 and valve 30 will be of conventional design, which design should be knowledgeable to one skilled in the art.

The valve 30 could be adjusted so that the valve 30 would open when the ambient conditions about the airplane are such that air flow through the gap 24, between the shield 11 and motor case 15, could cool the motor case 15 and the inner surface of the shield 11. If the ambient conditions are such that the air would not cool the missile 10, the thermally controlled inlet valve 30 would remain closed, air would not therefore enter the valve 30, but the eductor 29 would still evacuate the gap 24 between the motor case 15 and shield 11 and thus reduce the convective heat transfer between the shield 11 and the motor case 15.

The thermal protection system embodying the instant invention is more efficient in operation than a single layer of insulation of either equivalent volume or equivalent weight. It has also been determined that for a constant insulation thickness, the overall thermal resistance of the instant thermal protection system has a combined thermal resistivity that is four times greater than an equivalent insulation thickness.

A thermal protection system for missile components has then been provided that is more efficient and provides a lighter weight thermal protection system, the system will cool the missile during periods when the missile is or is not subjected to aerodynamic heating; since ablative insulations are not required and are therefore not used, the flight of the missile will not be affected by either radar attenuation or missile signature problems; and finally, it removes the necessity of refurbishing ablative insulation that is used as thermal protection in other types of missiles when the missile has not been launched, because of a delay in launching requirements.

It is believed that from the foregoing description, the mode of operation, as well as the structure of the thermal protection system, will be clear to one skilled in the art, and it is also to be understood that variations in such mode of operation and construction may be adhered to provided such variations fall within the spirit of the invention and the scope of the appended claims.

Having thus described the invention, what is claimed as new and desired to be secured by Letters Patent is:

1. A thermal protection system for solid propellant missiles that are subjected to excessive periods of aerodynamic heating, comprising an outer shield, a solid propellant rocket motor rigidly mounted in said shield and circumferentially spaced therefrom to provide a gap therebetween, a longitudinally extending corrugated insert mounted in the gap, the surfaces of said insert and the portions of said shield and said motor case confronting said gap being mirrored and supports for said motor case engaging said shield and closing the gap at the opposite ends thereof, and means for evacuating said gap to reduce to a minimum the free convection heat transfer between the mirrored surfaces of said insert, said shield and said rocket motor case.

2. A thermal protection system as in claim 1, wherein said means for evacuating said gap comprises an eductor mounted on said shield on a side remote from said motor and communicating with the gap and the external environment surrounding said shield, said eductor being effective to evacuate fluid in the gap.

3. A thermal protection system as in claim 2, wherein a thermally controlled inlet valve is mounted on said shield in communication with the agp for permitting the flow of a cooling medium in the gap as it is evacuated by said eductor.

References Cited

UNITED STATES PATENTS

| | | | |
|---|---|---|---|
| 2,883,828 | 4/1959 | Howell | 60—267 XR |
| 2,948,115 | 8/1960 | Dunsworth et al. | 60—266 XR |
| 3,122,891 | 3/1964 | Thomas | 89—1.8 XR |
| 3,244,224 | 4/1966 | Hnilicka | 165—136 XR |
| 3,267,559 | 8/1966 | Laux | 60—266 XR |

FOREIGN PATENTS 822,124 10/1959 Great Britain.

CARLTON R. CROYLE, *Primary Examiner.*

U.S. Cl. X.R.

60—266; 89—1.816, 1.817; 102—105